3,277,153
PROCESS FOR THE ISOLATION OF DIPHENYL CARBOXYLIC ACID METHYL ESTERS
Kurt Pieroh, Witten (Ruhr), Germany, assignor to Chemische Werke Witten G.m.b.H., Witten (Ruhr), Germany
No Drawing. Filed June 29, 1962, Ser. No. 206,518
Claims priority, application Germany, July 19, 1961,
C 24,646
6 Claims. (Cl. 260—475)

The present invention relates to a process for the preparation of diphenyl carboxylic acid methyl esters from the distillation residues obtained in the production of tere- and/or isophthalic acid dimethyl esters according to processes as taught in German Patents 949,564; 969,994; and 1,041,945 (which corresponds to U.S. Patent 2,894,978 of Katzschmann), which residues are not utilizable in themselves. The distillation residues mentioned above result from the process for producing terephthalic and isophthalic acids which comprises oxidizing a compound selected from the group consisting of p-xylene, m-xylene and mixtures thereof to form toluic acids, esterifying said toluic acids with methanol to form toluic acid monomethylesters, oxidizing said toluic acid monomethylesters to form benzene dicarboxylic acid monomethylesters, esterifying said benzene dicarboxylic acid monomethylesters to form dimethyl esters of terephthalic and isophthalic acids, distilling the reaction mixture containing said dimethyl esters of terephthalic and isophthalic acids to separate said dimethyl esters from the reaction mixture, thereby leaving said distillation residues.

During the production of the terephthalic acid dimethyl ester, according to the processes described in the aforementioned patents, which start with high-purity p-xylene, small quantities of non-distillable residues are formed in the oxidation process in addition to small quantities of isophthalic acid dimethyl ester. Heretofore, these residues could not be utilized.

It has now been found that diphenyl carboxylic acid methyl esters are present in the above-mentioned residues and that these diphenyl carboxylic acid methyl esters may be obtained in a simple manner by first subjecting the distillation residues to a re-esterification, preferably with methanol; subsequently digesting or dissolving the residues obtained in suitable organic solvents, such as methanol and xylene, at approximately the boiling point thereof after separation of the residues from the terephthalic and isophthalic acid dimethyl esters; purifying the constituent thereof which is soluble in the organic solvent, after separation of the organic solvent, as well as the constituent which is insoluble in the hot organic solvent, if necessary after cooling, in a conventional manner; and separating the various diphenyl carboxylic acid methyl esters.

It is an object of the present invention, therefore, to utilize in a practical manner the residues produced in oxidation processes for the production of tere- and isophthalic acid dimethyl esters.

It is another object to produce diphenyl carboxylic acid methyl esters from such residues.

Other objects will become apparent as the present description proceeds.

The distillation residues employed as starting material herein, which are obtained during the production of terephthalic acid dimethyl ester by the oxidation of xylene, especially high-purity xylene, generally have a relatively high acid number. It is thus necessary, according to the present invention, to subject the distillation residue first to a re-esterification, preferably with excess methanol. The re-esterification is conducted in an autoclave for several hours while heating to about 250° C., and the tere- and isophthalic acid dimethyl esters, which are present in the distillation residue in varying amounts, are subsequently distilled in vacuo. The residue obtained is a dark, viscous resin of medium hardness. It is digested or dissolved at approximately the boiling point of a suitable solvent, for example, methanol or xylene. In this manner, a separation of compounds soluble from those insoluble in the hot solvent may easily be effected. According to the present invention, the molten product is dissolved in, for instance, hot methanol at a ratio of 1:2 and the insoluble constituents are filtered off while hot.

After distillation of the methanol from the constituent which is soluble in methanol, a dark residue remains. This residue is preferably subjected to a fractional vacuum distillation at 0.3 mm. Hg. During this operation, small quantities of tere- and isophthalic acid dimethyl ester are distilled out. Between 180 and 240° C., a faintly yellow-colored, non-solidifying, highly viscous fraction passes over. The residue is a dark, brittle, solidifiable pitch and is discarded. The highly viscous and faintly yellowish-colored distillate, which passes over as the main fraction, will not solidify to a crystalline mass even after prolonged standing; however, when stirred in cooled ether or cooled methanol, a fine white crystal paste or slurry is surprisingly formed. This paste may easily be separated on a suction filter. By repeated recrystallization from methanol, in which the crystals are well dissolved under heat, diphenyl carboxylic acid methyl esters are obtained; for example, 2,4′,5-diphenyltricarboxylic acid trimethyl ester having a melting point of 109° C., and 4,4′-diphenyldicarboxylic acid dimethyl ester having a melting point of 216–218° C.

The carboxylic acid esters mentioned above may be converted into the corresponding free carboxylic acids in the usual manner. By saponifying the 2,4′,5-diphenyltricarboxylic acid methyl ester, 2,4′,5-diphenyltricarboxylic acid, which has a melting point of 313–314° C., is produced. In a similar manner, 4,4′-diphenyldicarboxylic acid may be prepared from the 4,4′-diphenyldicarboxylic acid methyl ester.

The separation of the constituent of the re-esterified residue which is insoluble in methanol after separation thereof from the tere- and isophthalic acid dimethyl esters may be made in a different manner. This separation may be carried out by fractional distillation under a high vacuum or, for example, by recrystallization, if necessary with the use of several different, suitable solvents. Because of the high boiling points of the esters in accordance with this invention, it is advantageous to employ recrystallization, as a more careful separation or purification is possible thereby. As solvents for the separation or purification, benzene, toluene, xylene, chloroform, etc., may be used.

From the constituent which is insoluble in methanol, the already discribed 4,4′-diphenyldicarboxylic acid dimethyl ester as well as 3,4-benzocoumarindicarboxylic acid dimethyl ester, having a melting point of 229° C., may be obtained by repeated recrystallization, if necessary with the addition of refining or activated carbon. Proof of the configuration of the last-mentioned ester may be determined from the dicarboxylation product of the acid obtained by saponification thereof, which has a melting point of 406° C. The 3,4-benzocoumarindicarboxylic acid was heated with copper powder, which resulted in a compound boiling at 360° (at 760 mm. Hg) and having a melting point of 94° C. These figures are identical with those of the 3,4-benzocoumarin (melting point 94° C.) obtained by oxidizing fluorenone with peracetic acid.

The diphenyl carboxylic acid methyl esters obtained according to the present invention may be converted—as already mentioned—into their corresponding acids by saponification and may be used as intermediate products, for instance, for the preparation of resins or also for the manufacture of pharmaceutical products.

The following examples serve to further explain the present invention without, however, limiting the same.

Example I 2,000 g. of distillation residue, obtained by the production of dimethyl terephthalate according to the processes described in German Patents 949,564; 969,994; and 1,041,945 (U.S. Patent 2,894,978) is re-esterified for 5 hours at 250° C. with four times this amount by weight of methanol. After this time, the starting acid number drops from 80 to <10. After distillation of the methanol, the terephthalic acid dimethyl ester and small quantities of isophthalic acid dimethyl ester, together with 390 g., i.e., 19.5% of the starting product, of residue are distilled at a vacuum of 60 mm. Hg under good reflux. The residual, higher boiling ester mixture is then stirred with 4,000 g. of methanol, boiled for a short time under reflux and subsequently filtered while hot. Thereby, 644 g., that is, 32% of the original batch, of methanol-insoluble constituents are obtained after drying.

Hereinbelow, the separation of the methanol extract is described first. After distillation of the methanol, there remains 960 g. of solid substance, corresponding to 48% of the original batch. In a subsequent fractional distillation under a pressure of 0.1 to 0.3 mm., 538 g., i.e., about 56% of the residue that remains after distillation of the methanol, of a substance which is easily soluble in methanol, passes over as a highly viscous, slightly yellowish-colored oil. 67 g. thereof, corresponding to 7%, is removed as the preliminary run. This amount still contains small amounts of terephthalic and isophthalic acid dimethyl ester. About 36% remains as pitch.

The main fraction of 538 g., which is a highly viscous oil, is stirred with 4 liters of methanol, and the solution is thereafter stirred for some time after cooling to about 10° C. After a short time, a crystal paste or slurry is formed which may be easily filtered off the methanol mother liquor. 155 g., i.e., 29% of the main fraction, is obtained in this manner as fine crystals having a melting point of 95–105° C. after drying.

Further purification or isolation takes place by recrystallization from methanol. Since 4,4'-diphenyldicarboxylic acid dimethyl ester is difficultly soluble in methanol, this compound remains and is added to the crude triester in approximately an amount of 10%. It may be further purified by recrystallization from benzene and yields by crystallization into laminae a compound having a melting point of 218° C.

Upon further recrystallization of the main amount of product, the melting point rises to 108–109° C. The pure compound shows a boiling point of 220° C. at 0.1 mm. Hg. In order to identify this compound, p-toluidine was diazotized and the double salt thereof formed by the addition of zinc chloride. This double salt was washed and finally rendered water-free by washing with acetone. The acetone-damp cake of the diazonium-zinc double salt compound was introduced into excess p-xylene and, while simultaneously stirring, condensation was started by the addition of water-free aluminum chloride thereof. Within one hour, the temperature rose from room temperature to 40° C. Thereupon, heating was continued for another hour to 80° C. The addition compound was subsequently split by the addition of ice water and hydrochloric acid, and the organic phase was separated in the conventional manner by distillation. The resulting product was 2,4',5-trimethyldiphenyl which was isolated or separated as a pure compound by further rectification under gas chromatographic control. By boiling for 48 hours with an aqueous permanganate solution, the corresponding tricarboxylic acid was obtained. The acid was converted to the trimethyl ester, which has a melting point of 108° C., by boiling for 24 hours with methanol with the addition of HCl. By comparing the mixed melting point thereof with the compound isolated from the residue, which shows no depression, the identity thereof with the synthetically prepared compound may be ascertained.

By the distillative separation or isolation of the methanol filtrate from the triester, highly viscous fractions are again obtained after distillation of the methanol, which fractions are once again freed from any triester still present with methanol at ordinary temperatures. The fractions now show saponification numbers which correspond to diphenyl dicarboxylic acid dimethyl esters. The highly viscous fractions are then saponified and the acids obtained are subjected to a separation on the basis of their different solubilities, for instance, in methanol, ether, or other solvents. By repeated recrystallization, an acid melting at 334° C. may be isolated which, when again esterified with methanol, yields a methyl ester having a melting point of 98.5–99.5° C. These data agree with the data for 3,4'-diphenyldicarboxylic acid and its dimethyl ester as described in the literature.

The separation of the constituents which are difficultly soluble in methanol, which include 644 g. and amount to about 32% of the entire residue used, is advantageously accomplished by recrystallization, for example, from benzene, toluene, or xylene. There are primarily two substances which are separated from one another by recrystallization, namely, the 3,4-benzocoumarindicarboxylic acid dimethyl ester, and the 4,4'-diphenyldicarboxylic acid dimethyl ester. The former represents the chief portion of the constituents which are difficultly soluble in methanol. By recrystallization from benzene, in which the 4,4'-diphenyldicarboxylic acid ester dissolves more easily than the 3,4-benzocoumarindicarboxylic acid ester, the two may be separated from one another. After repeated recrystallization, one compound shows a melting point of 229° C. and the other a melting point of 218° C.

In order to identify the compound making up the major proportion, and having a melting point of 229° C., the ester was saponified. The acid melted at 406° C. and was decarboxylated in the presence of Cu powder by heating to 400° C. At 360° C. (760 mm. Hg), a compound distilled which, after repeated recrystallization, showed a melting point of 94° C. The same compound is obtained when fluorenone is oxidized with peracetic acid.

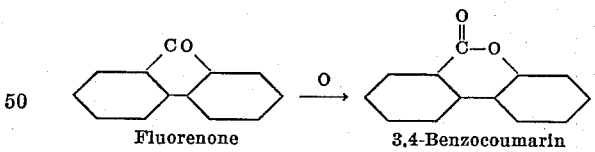

Fluorenone      3,4-Benzocoumarin

By a mixed melting point comparison, elemental analysis, etc., the identity of the synthetically made compound with that obtained by decarboxylation of the diphenyl-lactonic acid was proved.

Example II 367 g. of a residue, re-esterified as described in Example I and freed from the terephthalic acid dimethyl ester and isophthalic acid dimethyl ester by distillation in vacuo, is stirred into 4 liters of xylene while molten. 20 g. of A-carbon (activated carbon) and 20 g. of bleaching earth are added thereto. After boiling, the product is filtered while hot. During cooling of the filtrate, 77.5 g., corresponding to 21% of the starting material, crystallizes. This substance has a melting point of 210–215° C. Thereafter, the xylene is distilled off and the residue reacted with 500 cc. of hot methanol. By filtering while hot, another 3.5 g. is obtained, having a melting point of 207–210° C.

Upon the addition of 200 cc. of benzene, another 20.5 g. of material crystallizes during a period of cooling and standing overnight, with a melting point of 182–192° C.

Thus, a total of 101.5 g., corresponding to 27.6% of the starting material, of difficultly soluble constituents are obtained. After repeated recrystallization, for instance from xylene, these crystallizates can be further purified, whereby the melting point, which gradually increases to 229–230° C., serves as an indicator of the progress of the purification process.

The separation of the benzene-methanol filtrate, which contains the more easily soluble constituents, takes place after distillation of the benzene and methanol by distillation in a vacuum of about 0.1 mm. Hg in the same manner as described in Example I for the separation or purification of the constituents which are easily soluble in methanol.

While I have described my invention with reference to the above examples, etc., it will be understood that I do not wish to be limited thereto since many modifications may be made by one skilled in the art, and I intend to include such modifications and changes which fall within the scope of the appended claims.

I claim:
1. A process for producing diphenyl carboxylic acid methyl esters from the distillation residues obtained in the preparation of terephthalic and isophthalic acid dimethyl esters which comprises oxidizing a compound selected from the group consisting of p-xylene, m-xylene and mixtures thereof to form toluic acids, esterifying said toluic acids with methanol to form toluic acid monomethylesters, oxidizing said toluic acid monomethylesters to form benzene dicarboxylic acid monomethylesters, esterifying said benzene dicarboxylic acid monomethylesters to form dimethyl esters of terephthalic and isophthalic acids, distilling the reaction mixture containing said dimethyl esters of terephthalic and isophthalic acids to separate said dimethyl esters from the reaction mixture, thereby leaving a distillation residue, re-esterifying said distillation residue with an alcohol, separating the terephthalic and isophthalic acid dimethyl esters from the re-esterification mixture, adding the remaining re-esterification mixture to a heated solvent selected from the group consisting of methanol and xylene, thereby separating the soluble and insoluble components thereof, and purifying said soluble and insoluble components to obtain said diphenyl carboxylic acid methyl esters.

2. The process of claim 1, wherein the alcohol employed for said re-esterification is methanol.

3. The process of claim 1, wherein said terephthalic and isophthalic acid dimethyl esters are separated from said re-esterification mixture by distillation.

4. The process of claim 1, wherein the re-esterification is carried out at a temperature of about 250° C.

5. The process of claim 1, wherein said solvent is removed from the soluble component by distillation and the remaining residue is purified by distillation and recrystallization from a solvent to give a diphenyl carboxylic acid methyl ester selected from the group consisting of 2,4′,5-diphenyltricarboxylic acid trimethyl ester, 3,4′-diphenyldicarboxylic acid dimethyl ester, 4,4′-diphenyldicarboxylic acid dimethyl ester and mixtures thereof.

6. The process of claim 1, wherein the insoluble component is purified by recrystallization from at least one solvent to give a diphenyl carboxylic acid methyl ester selected from the group consisting of 4,4′-diphenyldicarboxylic acid dimethyl ester, 3,4-benzocoumarindicarboxylic acid dimethyl ester and mixtures thereof.

References Cited by the Examiner
UNITED STATES PATENTS
3,076,019  1/1963  Baldwin _____ 260—475

FOREIGN PATENTS
1,041,945  10/1958  Germany.

LORRAINE A. WEINBERGER, *Primary Examiner.*

HAROLD G. MOORE, *Examiner.*

R. E. MASSA, T. L. GALLOWAY, *Assistant Examiners.*